US008547612B2

(12) United States Patent
Okumura

(10) Patent No.: US 8,547,612 B2
(45) Date of Patent: Oct. 1, 2013

(54) IMAGE PROCESSING APPARATUS, IMAGE FORMING APPARATUS, AND IMAGE PROCESSING METHOD THAT READ COLOR IMAGE DATA FROM A DOCUMENT

(75) Inventor: Ryuichi Okumura, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 197 days.

(21) Appl. No.: 13/048,058

(22) Filed: Mar. 15, 2011

(65) Prior Publication Data

US 2011/0228299 A1 Sep. 22, 2011

(30) Foreign Application Priority Data

Mar. 17, 2010 (JP) ................................ 2010-060717

(51) Int. Cl.
*G03F 3/08* (2006.01)

(52) U.S. Cl.
USPC ............ 358/522; 358/1.9; 358/2.1; 358/3.26; 358/3.27; 358/518; 382/162; 382/167; 382/168; 382/169

(58) Field of Classification Search
USPC ............... 358/1.9, 2.1, 3.02, 3.09, 3.26, 3.27, 358/501, 505, 512, 518, 521, 522, 538; 382/162, 163, 164, 167, 169, 172, 263, 264
See application file for complete search history.

(56) References Cited

U.S. PATENT DOCUMENTS

| | | | |
|---|---|---|---|
| 6,567,544 B1 * | 5/2003 | Kanno et al. | 382/169 |
| 2002/0037102 A1 | 3/2002 | Toda | |
| 2006/0029280 A1 | 2/2006 | Toda | |
| 2007/0154091 A1 | 7/2007 | Toda | |
| 2010/0182618 A1 * | 7/2010 | Akiyama et al. | 358/1.9 |

FOREIGN PATENT DOCUMENTS

| | | |
|---|---|---|
| JP | 11-187266 | 7/1999 |
| JP | 2003-008909 | 1/2003 |
| JP | 2003-338930 | 11/2003 |
| JP | 2004-289570 | 10/2004 |

* cited by examiner

*Primary Examiner* — King Poon
*Assistant Examiner* — Jamares Q Washington
(74) *Attorney, Agent, or Firm* — K&L Gates LLP

(57) ABSTRACT

An image processing apparatus includes an image reading unit that reads an image of a document as color image data including pieces of color component data; a dot-component removing unit that removes dot components by smoothing each color component data; a high-frequency-color identifying unit that identifies, of colors represented by dot-removed color component data obtained by the smoothing, a high-frequency color satisfying a predetermined high-frequency condition; an individual-density-conversion-information generating unit that generates, for each high-frequency color, individual-density conversion information for converting each color component data such that a color near the high-frequency color becomes substantially the same as the high-frequency color; and a color-component-data converting unit that converts, based on the individual-density conversion information, each color component data in a part of the color image data, the part being data in which a color represented by the dot-removed color component data is a color near the high-frequency color.

5 Claims, 7 Drawing Sheets

START
CONVERT A RESOLUTION OF EACH OF RGB COLOR COMPONENT DATA (S1)
CALCULATE A FREQUENCY FOR EACH COLOR GROUP INCLUDING COLORS WITHIN A PREDETERMINED RANGE (S2)
EXTRACT COLOR GROUPS WITH A FREQUENCY HIGHER THAN OR EQUAL TO A PREDETERMINED FREQUENCY (S3)
CALCULATE A FREQUENCY FOR EACH COLORS INCLUDED IN EACH EXTRACTED COLOR GROUP (S4)
IDENTIFY A HIGH-FREQUENCY COLOR WITH THE HIGHEST FREQUENCY IN EACH EXTRACTED COLOR GROUP (S5)
GENERATE A SET OF INDIVIDUAL-DENSITY CONVERSION TABLES FOR EACH HIGH-FREQUENCY COLOR (S6)
START DENSITY CONVERSION (S7)
SMOOTH EACH OF RGB COLOR COMPONENT DATA (S8)
DOES SMOOTHED RGB COLOR COMPONENT DATA REPRESENT ANY COLOR CLOSE TO HIGH-FREQUENCY COLOR ? (S9) Yes / No
PERFORM DENSITY CONVERSION ON THE BASIS OF THE INDIVIDUAL DENSITY CONVERSION TABLES GENERATED FOR THE HIGH-FREQUENCY COLOR (S10)
HAVE STEPS FOR ONE DOCUMENT BEEN COMPLETED ? (S11) Yes / No
END

IMAGE PROCESSING APPARATUS, IMAGE FORMING APPARATUS, AND IMAGE PROCESSING METHOD THAT READ COLOR IMAGE DATA FROM A DOCUMENT

INCORPORATION BY REFERENCE

This application is based upon and claims the benefit of priority from the corresponding Japanese Patent application No. 2010-60717, filed Mar. 17, 2010, the entire contents of which is incorporated herein by reference.

BACKGROUND

The present invention relates to an image processing apparatus and method that read color image data including a plurality of pieces of color component data from a document. The invention also relates to an image forming apparatus that forms an image based on read color component data. In particular, the present invention relates to a technique for preventing show-through of a document.

When an image processing device mounted on a scanner, a copier, a facsimile, or a multifunction peripheral reads an image contained on only the front side of a document, and the document has images on both sides thereof, the occurrence of so-called "show-through" has been a problem. Show-through is caused when the image on the back side of the document appears in the read image. Typically, the density of the entire image of the document is reduced to prevent show-through. However, this creates the problem that the density of not only the show-through portion, but also of the original image of the document is reduced.

A technique has been proposed as a solution to this problem. The technique: first calculates a density histogram two-dimensionally representing a relationship between density and frequency; identifies a density with the highest frequency as a density of a background color; converts densities around the density of the background color uniformly to the same level as the density of the background color; and thereby prevents the occurrence of show-through.

FIG. 7 is an example of a density histogram that represents a relationship between density and frequency. The density histogram is obtained by calculating the frequency of density occurrence for each predetermined density range in image data. In the example of FIG. 7 the densities ranging from 0 to 15 occur most frequently.

However, in the proposed technique described above, even if there are a plurality of colors that occupy large areas of the image data of the document, processing for preventing show-through is performed based on the density of only the color that appears with the highest frequency. As a result, show-through cannot be prevented in other parts.

When the color image of a document is read, it is possible to calculate density histograms for respective pieces of color component data, identify a density with the highest frequency in each of the density histograms as a density in a background color, and convert each of the color component data to prevent show-through. However, since converting each color component data is performed over the entire image data, color reproducibility of the entire image data will be degraded. For example, assume that for color image data including RGB color component data, an R color component density close to a density of an R color component of a background color is converted to be the same as the density of the R color component of the background color. In this case, a density of not only an R color component of a show-through portion, but also that of an R color component included in an original image of a front side of a document is converted so as to be the same as the density of the R color component of the background color. As a result, since the R color component in the original image of the document is enhanced or suppressed, the color of the entire image is altered.

An alternative technique may be to identify, from a plurality of colors represented by a plurality of pieces of color component data, a high-frequency color that appears in the image of a document with a frequency that satisfies a predetermined high-frequency condition; generate, for each high-frequency color, a set of individual-density conversion tables to convert the respective pieces color component data such that a color close to the high-frequency color becomes substantially the same as the high-frequency color; and convert, for color image data representing the color close to the high-frequency color, the pieces of color component data based on the set of individual-density conversion tables corresponding to the high-frequency color. Thus, even if there are a plurality of high-frequency colors in the image of the document, it is possible to prevent show-through in the portions that correspond to the high-frequency colors. Additionally, since conversion of each color component data is only performed for color image data representing high-frequency colors, color reproducibility of the entire image is not degraded.

However, if there are dots (halftone dots) in a document to be read, the dot and background portion where there are no dots are divided into different color distributions in color image data read from the document. Therefore, since the color of the dot portion is not identified as a high-frequency color, one show-through that occurs in the dot portion may not be able to be removed.

SUMMARY

An image processing apparatus that reads color image data from a document is provided in an embodiment of the present disclosure that includes an image reading unit, a dot-component removing unit, a high-frequency-color identifying unit, an individual-density-conversion-information generating unit, and a color-component-data converting unit. The image reading unit reads an image of a document as color image data including a plurality of pieces of color component data. The dot-component removing unit removes dot components by smoothing each of the pieces of color component data included in the color image data read by the image reading unit. The high-frequency-color identifying unit identifies, from a plurality of colors represented by a plurality of pieces of dot-removed color component data obtained by the smoothing performed by the dot-component removing unit, a high-frequency color that satisfies a predetermined high-frequency condition. The individual-density-conversion-information generating unit generates, for each identified high-frequency color, individual-density conversion information for converting each of the pieces of color component data such that a color close to the high-frequency color becomes substantially the same as the high-frequency color. The color-component-data converting unit converts, based on the individual-density conversion information generated for the high-frequency color by the individual-density-conversion-information generating unit, each of the pieces of color component data included in a part of the color image data read by the image reading unit, the part being color image data in which a color represented by the pieces of dot-removed color component data obtained by the smoothing performed by the dot-component removing unit is a color that is close to the high-frequency color.

Pursuant to another embodiment of the present disclosure, an image forming apparatus that reads color image data from a document is provided that includes an image reading unit, a dot-component removing unit, a high-frequency-color identifying unit, an individual-density-conversion-information generating unit, a color-component-data converting unit, and an image forming unit. The image reading unit reads an image of a document as color image data including a plurality of pieces of color component data. The dot-component removing unit removes dot components by smoothing each of the pieces of color component data included in the color image data read by the image reading unit. The high-frequency-color identifying unit identifies, from a plurality of colors represented by a plurality of pieces of dot-removed color component data obtained by the smoothing performed by the dot-component removing unit, a high-frequency color that satisfies a predetermined high-frequency condition. The individual-density-conversion-information generating unit generates, for each identified high-frequency color, individual-density conversion information for converting each of the pieces of color component data such that a color close to the high-frequency color becomes substantially the same as the high-frequency color. The color-component-data converting unit converts, based on the individual-density conversion information generated for the high-frequency color by the individual-density-conversion-information generating unit, each of the pieces of color component data included in a part of the color image data read by the image reading unit, the part being color image data in which a color represented by the pieces of dot-removed color component data obtained by the smoothing performed by the dot-component removing unit is a color that is close to the high-frequency color. The image forming unit forms an image based on the pieces of color component data converted by the color-component-data converting unit.

An image processing method that reads color image data from a document is also provided pursuant to another embodiment of the present disclosure and includes the steps of reading, removing, identifying, generating, and converting. The reading step reads an image of a document as color image data including a plurality of pieces of color component data. The removing step removes dot components by smoothing each of the pieces of color component data included in the color image data read by the reading. The identifying step identifies, from a plurality of colors represented by a plurality of pieces of dot-removed color component data obtained by the smoothing, a high-frequency color that satisfies a predetermined high-frequency condition. The generating step generates, for each identified high-frequency color, individual-density conversion information for converting each of the pieces of color component data such that a color close to the high-frequency color becomes substantially the same as the high-frequency color. The converting step converts, based on the individual-density conversion information generated for the high-frequency color by the generating, each of the pieces of color component data included in a part of the color image data read by the reading, the part being color image data in which a color represented by the pieces of dot-removed color component data obtained by the smoothing is a color that is close to the high-frequency color.

Additional features and advantages are described herein, and will be apparent from the following Detailed Description and the figures.

BRIEF DESCRIPTION OF THE FIGURES

The following detailed description, given by way of example, but not intended to limit the disclosure solely to the specific embodiments described, may best be understood in conjunction with the accompanying drawings, in which.

DETAILED DESCRIPTION

Reference will now be made in detail to various embodiments of the disclosure, one or more examples of which are illustrated in the accompanying drawings. Each example is provided by way of explanation of the disclosure, and by no way limiting the present disclosure. In fact, it will be apparent to those skilled in the art that various modifications, combinations, additions, deletions and variations can be made in the present disclosure without departing from the scope or spirit of the present disclosure. For instance, features illustrated or described as part of one embodiment can be used in another embodiment to yield a still further embodiment. It is intended that the present disclosure covers such modifications, combinations, additions, deletions, applications and variations that come within the scope of the appended claims and their equivalents.

Embodiments of image processing apparatus, image forming apparatus, and image processing method that read color image data from a document will now be described.

To help understand the present invention, embodiments of the present invention will be described with reference to the attached drawings. Note that the embodiments to be described below are exemplary embodiments of the present invention and are not intended to limit the technical scope of the present invention.

Figure 1:
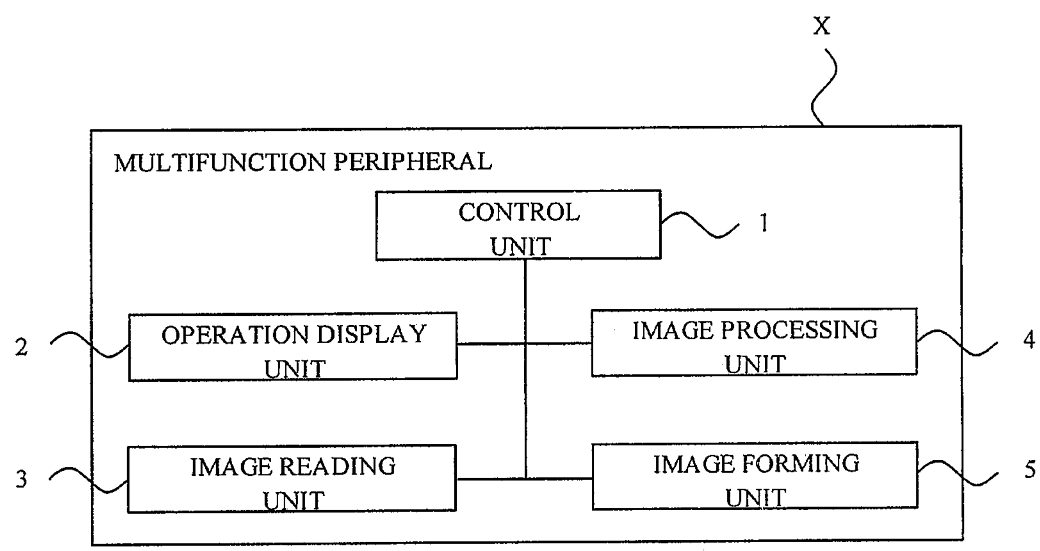
FIG. 1 is a block diagram illustrating a general configuration of a multifunction peripheral according to an embodiment of the present disclosure.

First, with reference to FIG. 1, a general configuration of a multifunction peripheral X according to an embodiment of the present disclosure will be described.

The multifunction peripheral X is an example of an image processing apparatus and an image forming apparatus according to the present disclosure. As illustrated in FIG. 1, the multifunction peripheral X principally includes a control unit 1, an operation display unit 2, an image reading unit 3, an image processing unit 4, and an image forming unit 5. Copiers, scanners, and facsimiles also correspond to the image processing apparatus or image forming apparatus according to the present disclosure.

The control unit 1 includes peripheral devices, such as a central processing unit (CPU), a read-only memory (ROM), and a random-access memory (RAM). The control unit 1 performs the overall control of the multifunction peripheral X by causing the CPU to execute processing in accordance with a predetermined control program stored in the ROM.

The operation display unit 2 includes a liquid-crystal display, a touch panel, and various operation keys for displaying various types of information and allowing a user to input operations on the multifunction peripheral X.

The image reading unit 3 includes a charge-coupled device (CCD) sensor that reads an image of a document that is placed on a document plate (not shown) or fed by an automatic document feeder (ADF) (not shown). The image reading unit 3 reads the image of the document as color image data including color component data of three colors, red (R), green (G), and blue (B) (hereinafter referred to as R color component data, G color component data, and B color component data (or RGB color component data)). The image reading unit 3 reads an image of either a monochrome or color document as color image data including RGB color component data.

The image processing unit 4 performs various types of image processing, such as density conversion described below (see FIG. 6) and known gamma correction, shading correction, smoothing and enhancement, and CMYBk conversion, on the color image data read by the image reading unit 3. For example, CMYBk conversion involves converting the RGB color component data to color image data including CMYBk color component data.

When the multifunction peripheral X copies, the image processing unit 4 outputs the processed color image data to the image forming unit 5. When the multifunction peripheral X scans, the image processing unit 4 stores the processed color image data in an internal storage unit or transmits it through a network, such as a local area network (LAN), to a predetermined information processing apparatus or the like.

The image forming unit 5 includes the constituent parts of known electrophotographic image forming unit, such as photosensitive drums and developing devices corresponding to respective CMYBk colors. On a sheet that is fed from a paper feed cassette, the image forming unit 5 forms a monochrome image or a color image based on the processed color image data (each color component data) input from the image processing unit 4.

The multifunction peripheral X features density conversion (see FIG. 6) performed by the image processing unit 4. The density conversion will now be described.

Figure 2:
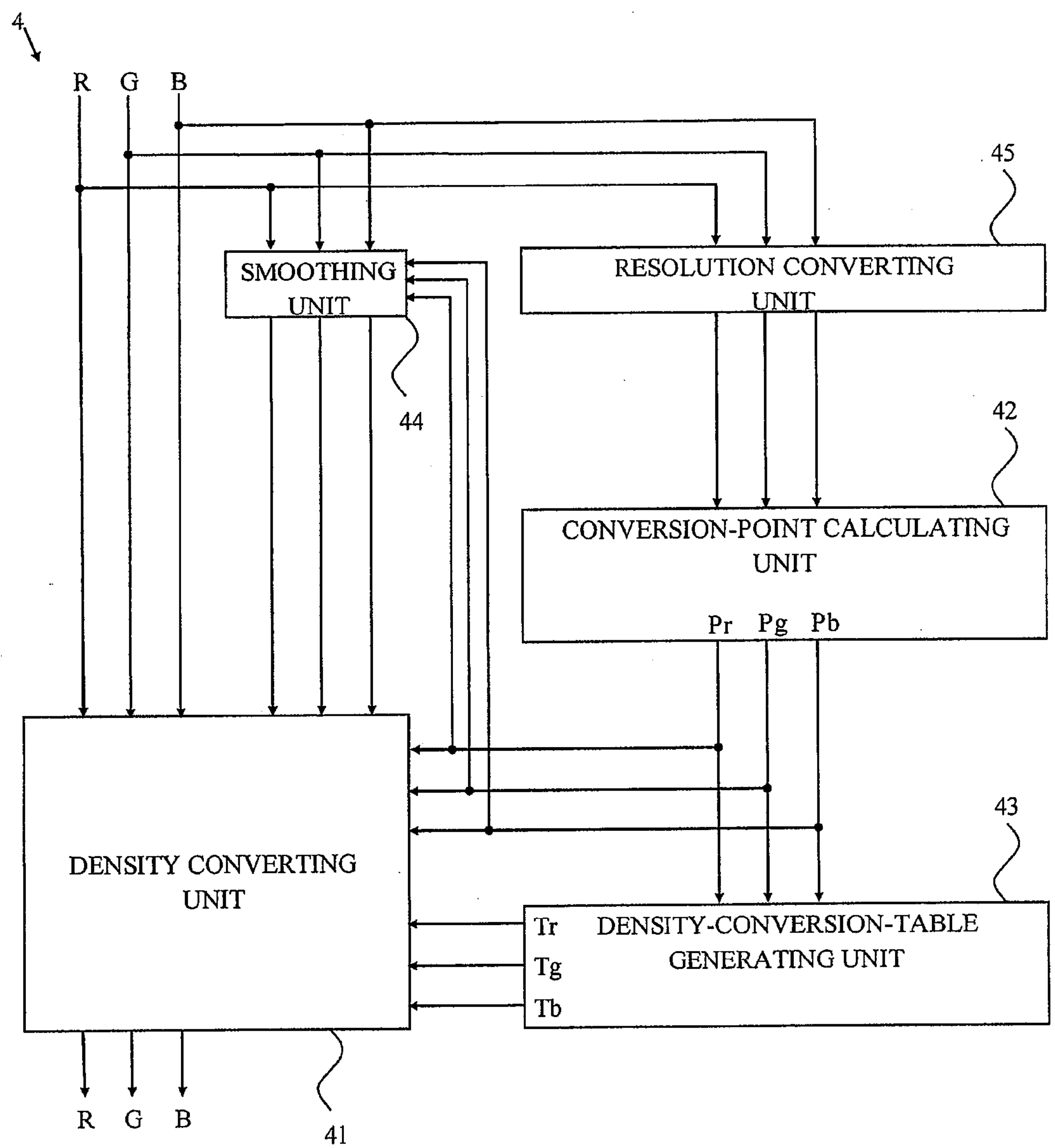
FIG. 2 is a block diagram illustrating a configuration of a main part of an image processing unit included in the multifunction peripheral.

FIG. 2 is a block diagram illustrating the main functions of the image processing unit 4.

As illustrated in FIG. 2, the image processing unit 4 includes a density converting unit 41, a conversion-point calculating unit 42, a density-conversion-table generating unit 43, a smoothing unit 44, and a resolution converting unit 45. The image processing unit 4 includes other image processing sections that perform various types of image processing, such as gamma correction, shading correction, smoothing and enhancement, and CMYBk conversion, on the color image data processed by the density converting unit 41. However, such image processing sections will not be described herein, as they are substantially the same as existing ones.

Each of the density converting unit 41, the conversion-point calculating unit 42, the density-conversion-table generating unit 43, the smoothing unit 44, and the resolution converting unit 45 may be either an electronic circuit having the function described below or a processing function that is realized when processing is performed by an arithmetic processing unit such as a microprocessing unit (MPU).

The density converting unit 41 converts, based on a set of predetermined density conversion tables, the RGB color component data included in the color image data read by the image reading unit 3. The density converting unit 41 corresponds to a color-component-data converting unit. Although conversion of RGB color component data will be described in the present embodiment, the same technique is applicable to the situation where, for example, after conversion of RGB data to CMY data, each of the cyan (C), magenta (M), and yellow (Y) image data is converted.

The resolution converting unit 45 converts the resolution of each of the RGB color component data to a predetermined lower resolution to smooth the RGB color component data, and thereby removes dot (halftone dot) components from the RGB color component data. The resolution converting unit 45 corresponds to a first dot-component removing unit. The resolution converting unit 45 outputs, to the conversion-point calculating unit 42, the RGB color component data from which dot components have been removed (first dot-removed color component data).

For example, the resolution converting unit 45 converts RGB color component data having a resolution of 600 dpi, while averaging the RGB color component data for every 8×8=64 dots (an example of a predetermined unit), to RGB color component data having a lower resolution of about 75 dpi. Since this smoothes each of the RGB color component data, dot components in each of the RGB color component data output from the resolution converting unit 45 are removed.

The smoothing unit 44 smoothes the RGB color component data using a predetermined smoothing filter to remove dot components therefrom. The smoothing filter is, for example, a known median filter or averaging filter. The smoothing unit 44 corresponds to a second dot-component removing unit. The smoothing unit 44 outputs, to the density converting unit 41, the RGB color component data from which dot components have been removed (second dot-removed color component data).

To accommodate, for example, 150 or 175 lines per inch that is typically used in printing magazines, a less costly filter, such as a 3×3 or 5×5 median filter, may be used as the smoothing filter. Using a larger smoothing filter, it is possible to accommodate a smaller number of lines per inch (such as 65) that is used in printing newspapers.

The smoothing unit 44 and the resolution converting unit 45 is not be limited to those described herein, as long as it is possible to remove dot components from each of the RGB color component data. For example, both the smoothing unit 44 and the resolution converting unit 45 may be configured to perform conversion to a lower resolution or may be configured to use a smoothing filter. Alternatively, the smoothing unit 44 and the resolution converting unit 45 may be replaced with a single dot-component removing unit configured to smooth each of the RGB color component data to remove dot components therefrom, and to output the resulting dot-removed color component data to the density converting unit 41 and the conversion-point calculating unit 42. Note, however, that processing time can be reduced with two different dot-component removing units; the first dot-component removing unit performs processing uniformly over the entire color image data and the second dot-component removing unit performs processing on a specific portion of the color image data.

In the present embodiment, when the conversion-point calculating unit 42 performs processing based on the RGB color component data output from the resolution converting unit 45, the resolution converting unit 45 performs conversion to a lower resolution to accelerate processing speed.

The conversion-point calculating unit 42 identifies, from a plurality of colors represented by RGB color component data input from the resolution converting unit 45, a high-frequency color that satisfies a predetermined high-frequency condition. The conversion-point calculating unit 42 corresponds to a high-frequency-color identifying unit.

Then, the conversion-point calculating unit 42 outputs, to the density converting unit 41 and the density-conversion-table generating unit 43, a set of conversion points Pr, Pg, and Pb corresponding to respective density values of the RGB color component data representing the identified high-frequency color.

A technique that is used by the conversion-point calculating unit 42 to identify a high-frequency color will now be described.

First, when a plurality of colors represented by RGB color component data are divided into color groups each having a predetermined range of colors, the conversion-point calculating unit 42 calculates a first color histogram (three-dimensional histogram) that represents the frequency (or number) of pixels for each of the color groups included in the entire color image data represented by the RGB color component data output from the resolution converting unit 45. The conversion-point calculating unit 42 that performs this process corresponds to a first-color-histogram calculating unit.

Figure 3:
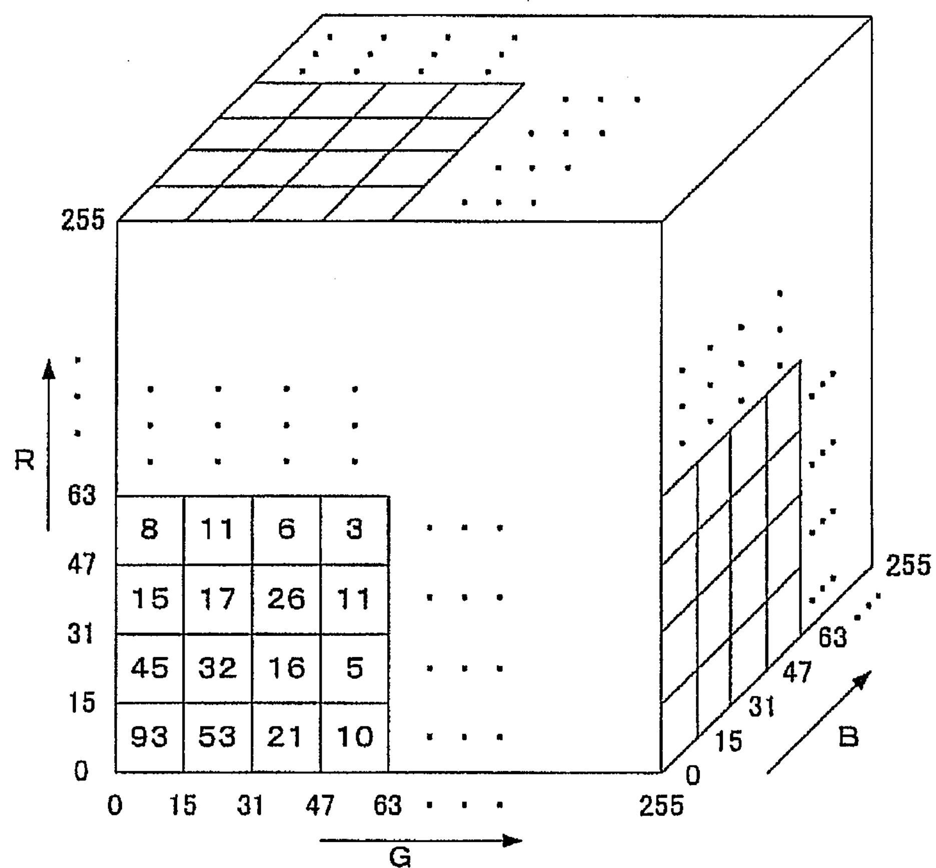
FIG. 3 is a color histogram.

FIG. 3 illustrates an example of the first color histogram.

As illustrated in FIG. 3, the first color histogram is obtained by three-dimensionally arranging density values of RGB color component data included in color image data, and calculating a frequency for each color group including colors within a predetermined range defined by three-dimensional density values (R, G, B). Specifically, the first color histogram illustrated in FIG. 3 is obtained by dividing 256×256×256=16777216 colors represented by combinations of values of the respective RGB color component data into 16×16×16=4096 color groups, and then calculating a frequency of pixels for each of the color groups included in an image of a document. In this example, colors within a predetermined range of each of the color groups are as follows: (R, G, B)=(0 to 15, 0 to 15, 0 to 15), (16 to 31, 0 to 15, 0 to 15), (32 to 47, 0 to 15, 0 to 15), . . . , and (239 to 255, 239 to 255, 239 to 255).

Based on the first color histogram, the conversion-point calculating unit 42 extracts a high-frequency color group having a frequency greater than or equal to a predetermined frequency. The conversion-point calculating unit 42 that performs this process corresponds to a high-frequency-color-group extracting unit. The predetermined frequency is determined in advance, for example, whether a color occupies an area large enough to cause significant show-through in an image of a document.

The conversion-point calculating unit 42 is designed not only to identify a color group with the highest frequency, but also to extract a high-frequency color group with a frequency greater than or equal to the predetermined frequency. This means that a plurality of high-frequency color groups may be extracted.

Then, for each high-frequency color group, the conversion-point calculating unit 42 calculates a second color histogram that represents frequencies of respective colors included in the high-frequency color group. The conversion-point calculating unit 42 that performs this process corresponds to a second-color-histogram calculating unit.

For example, as illustrated in FIG. 3, when the first color histogram is one that is obtained by dividing 256×256×256=16777216 colors represented by values of RGB color component data into 16×16×16=4096 color groups and calculating a frequency for each color group, the second color histogram is one that is obtained by calculating a frequency of each of 16×16×16=4096 colors included in each color group.

Then, based on the second color histogram, the conversion-point calculating unit 42 identifies a color with the highest frequency in each high-frequency color group as a high-frequency color that satisfies the high-frequency condition. If a plurality of high-frequency color groups are extracted as described above, a plurality of high-frequency colors are identified.

As described above, after calculating the first color histogram, which is a rougher histogram, the conversion-point calculating unit 42 extracts one or more color groups with a frequency greater than or equal to a predetermined frequency. Then, for each of only the extracted one or more color groups, the conversion-point calculating unit 42 calculates the second color histogram, which is a more detailed histogram. Therefore, as compared to the situation where a histogram representing frequencies of all colors (16777216 colors in the above example) is calculated, the processing load can be significantly reduced.

For each high-frequency color identified by the conversion-point calculating unit 42, the density-conversion-table generating unit 43 generates a set of individual-density conversion tables (an example of individual-density conversion information) that is used to convert the respective RGB color component data such that a color close to the high-frequency color becomes substantially the same as the high-frequency color. The density-conversion-table generating unit 43 outputs the set of individual-density conversion tables to the density converting unit 41. The density-conversion-table generating unit 43 corresponds to an individual-density-conversion-information generating unit.

When a plurality of high-frequency colors are identified by the conversion-point calculating unit 42, the density-conversion-table generating unit 43 generates a plurality of sets of individual-density conversion tables Tr, Tg, and Tb corresponding to the respective RGB color component data.

FIG. 4A to FIG. 4C and FIG. 5A to FIG. 5C illustrate an example of individual-density conversion tables generated by the density-conversion-table generating unit 43 when the conversion-point calculating unit 42 identifies two high-frequency colors; a first high-frequency color and a second high-frequency color. The number of individual-density conversion tables generated by the density-conversion-table generating unit 43 varies depending on the number of high-frequency colors identified.

Figure 4C:
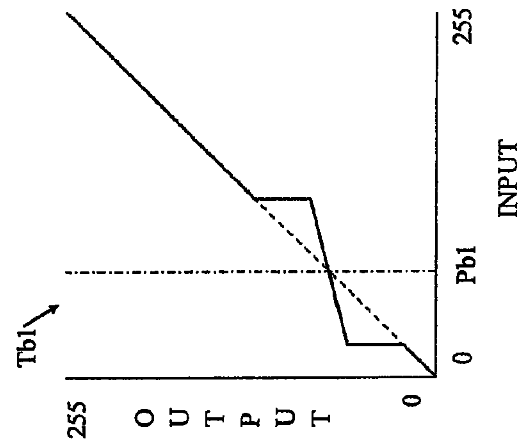
FIG. 4A to FIG. 4C illustrate a set of density conversion tables generated by a density conversion performed by the multifunction peripheral.
Figure 4B:
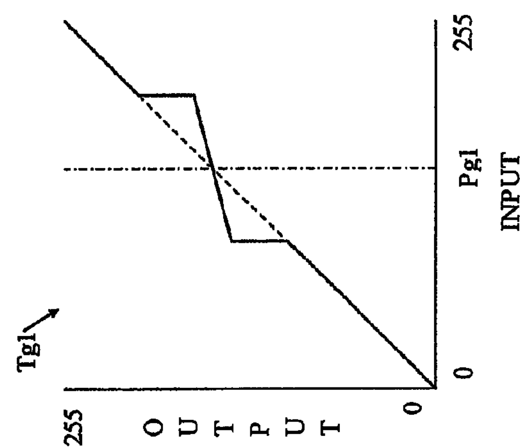
Figure 4A:
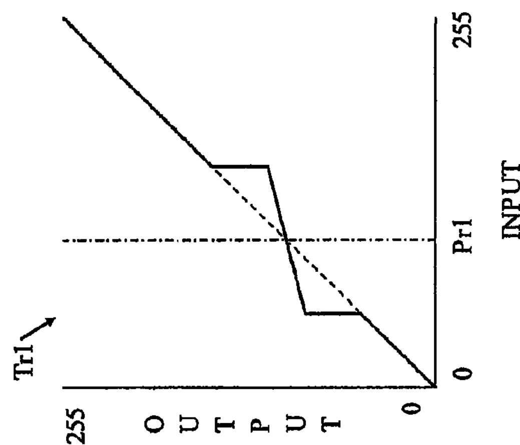

FIG. 4A to FIG. 4C illustrate an example of individual-density conversion tables generated for the first high-frequency color represented by a set of conversion points Pr1, Pg1, and Pb1 which are values of color components R, G, and B, respectively. FIG. 4A to FIG. 4C illustrate a set of individual-density conversion tables Tr1, Tg1, and Tb1 corresponding to respective RGB color component data.

Figures 5A, 5B, 5C:
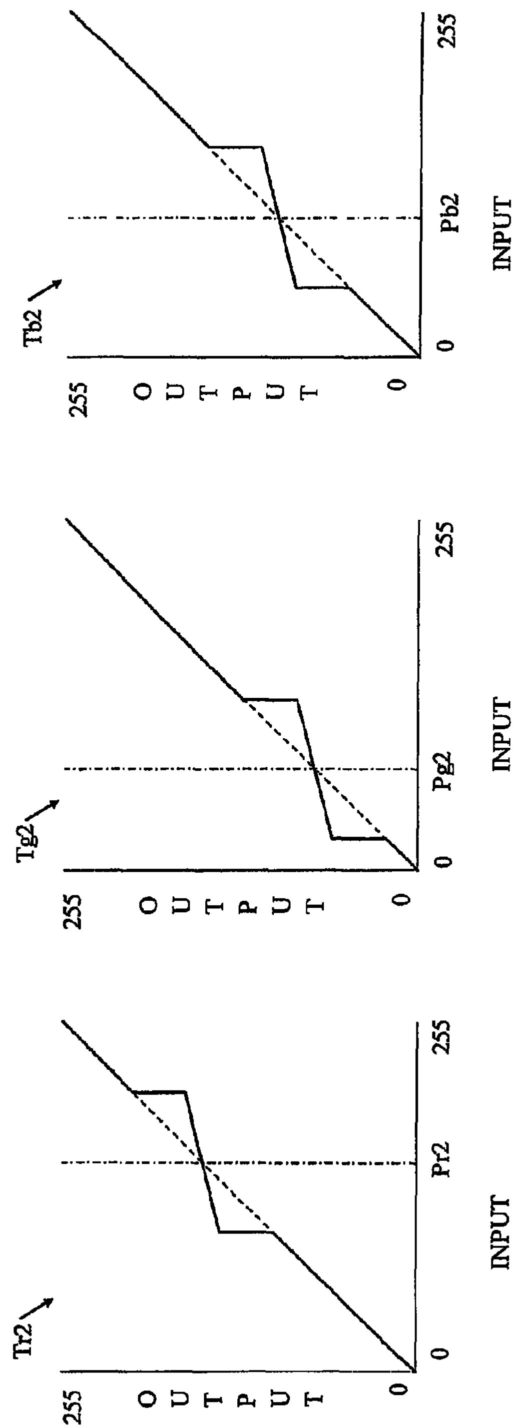
FIG. 5A to FIG. 5C illustrate another set of density conversion tables generated by a density conversion performed by the multifunction peripheral.

FIG. 5A to FIG. 5C illustrate an example of individual-density conversion tables generated for the second high-frequency color represented by a set of conversion points Pr2, Pg2, and Pb2 which are values of color components R, G, and B, respectively. FIG. 5A to FIG. 5C illustrate a set of individual-density conversion tables Tr2, Tg2, and Tb2 corresponding to respective RGB color component data.

The individual-density conversion table Tr1 illustrated in FIG. 4A is used to convert densities within a predetermined range centering on the conversion point Pr1, which is the value of the R color component included in the first high-frequency color, such that the densities become substantially the same as the conversion point Pr1.

Similarly, the individual-density conversion tables Tg1 and Tb1 illustrated in FIG. 4B and FIG. 4C are used to convert densities within corresponding predetermined ranges centering on the respective conversion points Pg1 and Pb1, which are the values of the respective G and B color components included in the first high-frequency color, such that the densities become substantially the same as the corresponding conversion points Pg1 and Pb1. The same applies to the set of individual-density conversion tables Tr2, Tg2, and Tb2 illustrated in FIG. 5A to FIG. 5C.

The density conversion tables are not limited to those illustrated in FIG. 4A to FIG. 4C and FIG. 5A to FIG. 5C, as long as they can be used to prevent show-through by making colors that are close to the corresponding high-frequency colors substantially the same as the corresponding high-frequency colors.

With reference to the flowchart of FIG. 6, a process for density conversion performed by the image processing unit 4 will be described. Note that S1, S2, etc. in the drawing denote steps of the processing procedure.

The density conversion is started by the image processing unit 4 when color image data is read from a document by the image reading unit 3 and RGB color component data included in the color image data is inputted to the image processing unit 4.

For example, the control unit 1 or the image processing unit 4 may be configured to select, in accordance with a user operation on the operation display unit 2, whether to perform the density conversion, that is, whether to remove show-through. The predetermined frequency used by the conversion-point calculating unit 42, as a determination index, may be preferably changed by the control unit 1 or the image processing unit 4 in accordance with a user operation on the operation display unit 2.

Figure 6:
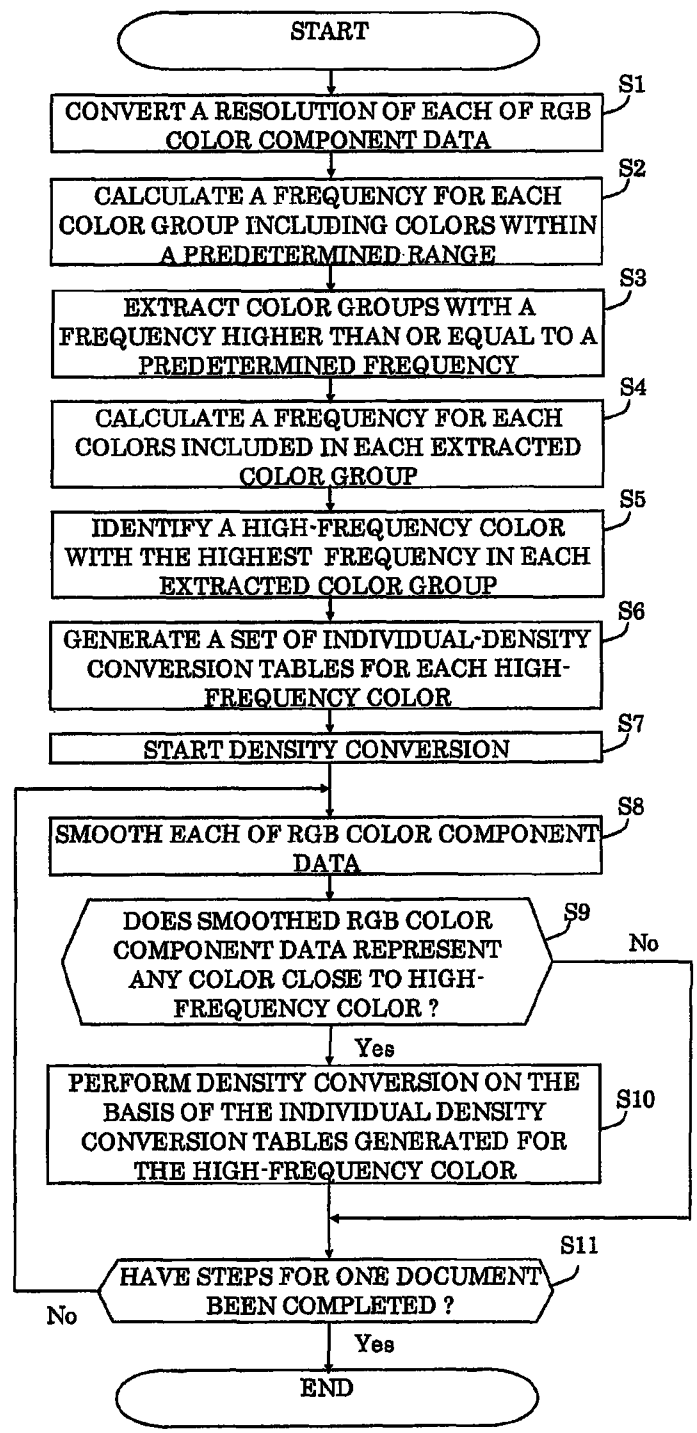
FIG. 6 is a flowchart illustrating a procedure of density conversion performed by the multifunction peripheral.
Figure 7:
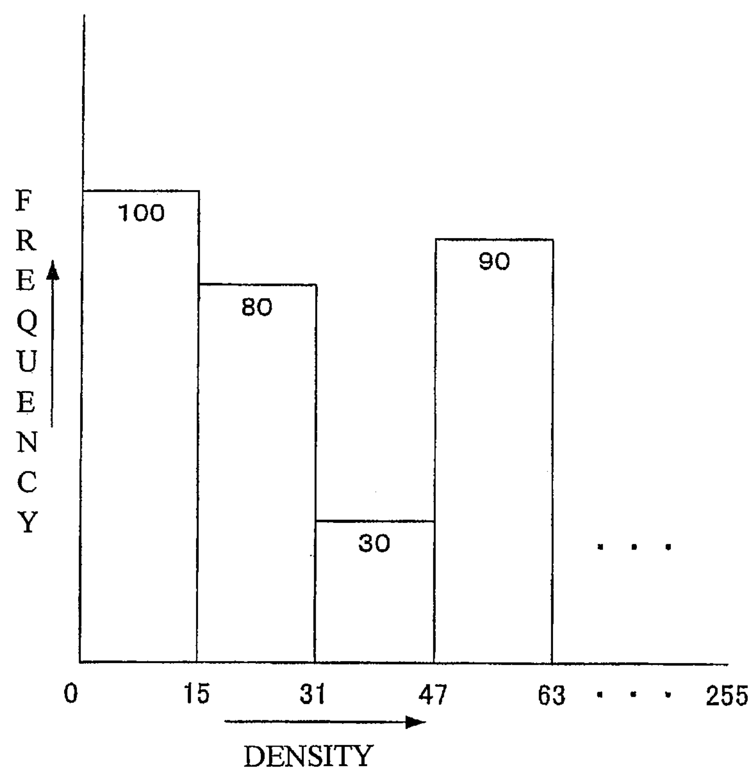
FIG. 7 is a density histogram.

In step S1 of FIG. 6, the resolution converting unit 45, in the image processing unit 4, converts a resolution of each of RGB color component data included in color image data read from a document by the image reading unit 3 to a lower resolution, so as to remove dot components. The resolution converting unit 45 outputs the resulting RGB color component data to the conversion-point calculating unit 42. For example, when the resolution of color component data included in color image data read by the image reading unit 3 is 600 dpi, the resolution is converted to a lower resolution of 75 dpi. The converted lower resolution is not limited to 75 dpi and may be any resolution, such as 100 dpi, as long as dot components in the RGB color component data can be removed and their effects can become ignorable.

In step S2 through step S5, the conversion-point calculating unit 42 in the image processing unit 4 identifies a high-frequency color based on the RGB color component data inputted from the resolution converting unit 45.

Specifically, as described above, the conversion-point calculating unit 42 calculates the first color histogram by calculating the frequency for each color group including colors within a predetermined range (see FIG. 3) (step S2) and extracts one or more color groups having a frequency greater than or equal to a predetermined frequency based on the first color histogram (step S3). The conversion-point calculating unit 42 then calculates the second color histogram for each extracted color group (step S4) and identifies the color with the highest frequency in each color group (step S5).

Even if the document is one that contains dot components, the image processing unit 4 removes the dot components in step S1. Therefore, the high-frequency color can be properly identified as in the situation where no dot components are contained in the document.

In step S6, the density-conversion-table generating unit 43 in the image processing unit 4 generates a set of individual-density conversion tables (see FIG. 4A to FIG. 4C and FIG. 5A to FIG. 5C) for each high-frequency color identified by the conversion-point calculating unit 42, and outputs the individual-density conversion tables to the density converting unit 41.

In step S7, based on the individual-density conversion tables and the conversion points Pr, Pg, and Pb for the RGB color component data representing each high-frequency color input from the conversion-point calculating unit 42, the density converting unit 41 in the image processing unit 4 starts density conversion of color image data for each pixel of the document image read by the image reading unit 3.

In step S8, the smoothing unit 44 smoothes each of the RGB color component data to remove dot components therefrom, and outputs the resulting RGB color component data to the density converting unit 41.

In step S8, the smoothing unit 44 may smooth each of the RGB color component data included in the entire color image data. Alternatively, for example, only the color image data of pixels corresponding to dot components may be extracted from the entire color image data and RGB color component data included in the extracted color image data may be smoothed. Thus, since a region except a dot portion is not smoothed, it is possible to prevent unnecessary density conversion from being performed in step S10 (described below), and thus to prevent the degradation of color reproducibility.

In step S9, the density converting unit 41 determines whether color image data inputted from the image reading unit 3 is one in which RGB color component data, obtained after RGB color component data included in the color image data is smoothed by the smoothing unit 44, represents any color that is close to the high-frequency color. Thus, even if the document is one that contains dot components, the density converting unit 41 can determine whether RGB color component data corresponding to the dot portion represents a color close to the high-frequency color.

If the smoothed RGB color component data represents a color close to the high-frequency color (YES in step S9), the process proceeds to step S10 (described below). If the smoothed RGB color component data does not represent a color close to the high-frequency color (NO in step S9), the process proceeds to step S11. For example, as described with reference to FIG. 4A to FIG. 4C and FIG. 5A to FIG. 5C, if color image data of a color that is close to either the high-frequency color represented by the set of conversion points Pr1, Pg1, and Pb1 or the high-frequency color represented by the set of conversion points Pr2, Pg2, and Pb2 is inputted from the smoothing unit 44 (YES in step S9), the process proceeds to step S10.

Therefore, for color image data in which the RGB color component data inputted from the smoothing unit 44 does not represent a color that is close to the high-frequency color, conversion of the RGB color component data based on the individual-density conversion tables is not performed in step S10. Alternatively, however, density conversion may be performed based on the predetermined conversion tables preset as initial values.

In step S10, for a part of the color image data read by the image reading unit 3, the part being the color image data in which a color represented by the RGB color component data smoothed by the smoothing unit 44 is a color that is close to the high-frequency color, the RGB color component data is converted based on the individual-density conversion tables generated for the high-frequency color.

For example, if color image data is inputted in which a color represented by RGB color component data smoothed by the smoothing unit 44 is a color that is close to the high-frequency color represented by the set of conversion points Pr1, Pg1, and Pb1 illustrated in FIG. 4A to FIG. 4C, the RGB color component data is converted based on the set of individual-density conversion tables Tr1, Tg1, and Tb1 generated for the high-frequency color in step S6. Similarly, if color image data is inputted in which a color represented by RGB color component data smoothed by the smoothing unit 44 is a color that is close to the high-frequency color represented by the set of conversion points Pr2, Pg2, and Pb2 illustrated in FIG. 5A to FIG. 5C, the RGB color component data is converted based on the set of individual-density conversion tables Tr2, Tg2, and Tb2 generated for the high-frequency color in step S6.

Then, the density converting unit 41 determines whether step S8 through step S10 have been completed for the entire color image data of one document read by the image reading unit 3. Until these steps, for one document, have been completed (NO in step S11), the process returns to step S8. If these steps, for one document, have been completed (YES in step S11), the density conversion ends and the image processing unit 4 waits for the next color image data.

As described above, the image processing unit 4 performs various types of image processing, such as gamma correction, shading correction, smoothing and enhancement, and CMYBk conversion, on color image data on which density conversion has been performed.

As described above, in the multifunction peripheral X, for a part of color image data read by the image reading unit 3, the part being color image data wherein a color represented by RGB color component data smoothed by the smoothing unit 44 is a color that is close to a high-frequency color identified by the conversion-point calculating unit 42, the density converting unit 41 converts the RGB color component data based on the individual-density conversion tables generated for the high-frequency color. Therefore, even if dot components are contained in the document, show-through on the dot portion can be removed. Additionally, even when there are a plurality of high-frequency colors in an image of the read document, that is, even when there are a plurality of portions where show-through is likely to occur in the image of the document, it is possible to prevent show-through in the plurality of portions. For color image data representing colors other than the high-frequency color, conversion of the RGB color component data based on the individual-density conversion tables is not performed. Therefore, degradation of color reproducibility in the entire image can be prevented.

The density conversion of the present embodiment (see FIG. 6) has been described as one that is performed independent of the gamma correction in the image processing unit 4. Alternatively, the gamma correction may be performed as part of the density conversion.

In this case, for each high-frequency color, the density-conversion-table generating unit 43 generates a set of individual gamma tables (an example of individual-density conversion information) corresponding to the RGB color component data and outputs the individual gamma tables to the density converting unit 41. Like the individual-density conversion tables described above (see FIG. 4A to FIG. 4C and FIG. 5A to FIG. 5C), the individual gamma tables generated by the density-conversion-table generating unit 43 realize input-output characteristics that can make colors close to the high-frequency color substantially the same as the high-frequency color.

Then, for color image data that represents any color that is close to the high-frequency color, the density converting unit 41 performs gamma correction on the RGB color component data included in the color image data based on the individual gamma tables generated by the density-conversion-table generating unit 43. For color image data that represents other colors, the density converting unit 41 performs gamma correction on the RGB color component data included in the color image data based on, for example, initial gamma tables preset as initial values.

In the gamma correction performed in the image processing unit 4, for color image data that represents a color that is close to the high-frequency color, density conversion is performed based on the individual-density conversion tables. It is thus possible to prevent show-through.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image processing apparatus that reads color image data from a document comprising:

an image reading unit configured to read an image of a document as color image data including a plurality of pieces of color component data;

a dot-component removing unit configured to remove dot components by smoothing each of the pieces of color component data included in the color image data read by the image reading unit;

a high-frequency-color identifying unit configured to identify, from a plurality of colors represented by a plurality of pieces of dot-removed color component data obtained by the smoothing performed by the dot-component removing unit, a high-frequency color that satisfies a predetermined high-frequency condition;

an individual-density-conversion-information generating unit configured to generate, for each high-frequency color identified by the high-frequency-color identifying unit, individual-density conversion information for converting each of the pieces of color component data such that a color close to the high-frequency color becomes substantially the same as the high-frequency color; and a color-component-data converting unit configured to convert, based on the individual-density conversion information generated for the high-frequency color by the individual-density-conversion-information generating unit, each of the pieces of color component data included in a part of the color image data read by the image reading unit, the part being color image data wherein a color represented by the pieces of dot-removed color component data obtained by the smoothing performed by the dot-component removing unit is a color that is close to the high-frequency color, wherein the dot-component removing unit includes a first dot-component removing unit and a second dot-component removing unit that remove dot components by smoothing each of the pieces of color component data included in the color image data read by the image reading unit;

the high-frequency-color identifying unit identifies, from a plurality of colors represented by a plurality of pieces of first dot-removed color component data obtained by the smoothing performed by the first dot-component removing unit, a high-frequency color that satisfies a predetermined high-frequency condition;

the color-component-data converting unit converts, based on the individual-density conversion information generated for the high-frequency color by the individual-density-conversion-information generating unit, each of the pieces of color component data included in a part of the color image data read by the image reading unit, the part being color image data in which a color represented by a plurality of nieces of second dot-removed color component data obtained by the smoothing performed by the second dot-component removing unit is a color that is close to the high-frequency color;

the first dot-component removing unit converts a resolution of each of the pieces of color component data to a predetermined lower resolution while averaging each of the pieces of color component data with respect to each predetermined unit, and thereby removes dot components by smoothing each of the pieces of color component data;

the first dot-component removing unit removes dot components over the entire color image data read by the image reading unit;

the second dot-component removing unit removes dot components by smoothing each of the pieces of color component data with a predetermined smoothing filter; and the second dot-component removing unit removes dot components only on a dot portion of the color image data read by the image reading unit.

2. The image processing apparatus according to claim 1, wherein the high-frequency-color identifying unit includes:

a first-color-histogram calculating unit that calculates a first color histogram representing, when a plurality of colors represented by the pieces of color component data are divided into color groups each having a predetermined range of colors, frequencies for the respective color groups included in the entire color image data represented by the dot-removed color component data obtained by the smoothing performed by the dot-component removing unit;

a high-frequency-color-group extracting unit that extracts, based on the first color histogram calculated by the first-color-histogram calculating unit, a high-frequency color group with a frequency greater than or equal to a predetermined frequency; and a second-color-histogram calculating unit that calculates, for each high-frequency color group extracted by the high-frequency-color-group extracting unit, a second color histogram representing frequencies of respective colors included in the high-frequency color group; and wherein the high-frequency-color identifying unit identifies, based on the second color histogram calculated by the second-color-histogram calculating unit, a color with the highest frequency in each high-frequency color group as a high-frequency color that satisfies the high-frequency condition.

3. The image processing apparatus according to claim 1, wherein the individual-density conversion information is a gamma table for performing gamma correction on the color component data.

4. The image processing apparatus according to claim 1, wherein the plurality of pieces of color component data are pieces selected from the group consisting of red, green, and blue image data, and cyan, magenta, and yellow image data.

5. An image forming apparatus that reads color image data from a document comprising:

an image reading unit configured to read an image of a document as color image data including a plurality of pieces of color component data;

a dot-component removing unit configured to remove dot components by smoothing each of the pieces of color component data included in the color image data read by the image reading unit;

a high-frequency-color identifying unit configured to identify, from a plurality of colors represented by a plurality of pieces of dot-removed color component data obtained by the smoothing performed by the dot-component removing unit, a high-frequency color that satisfies a predetermined high-frequency condition;

an individual-density-conversion-information generating unit configured to generate, for each high-frequency color identified by the high-frequency-color identifying unit, individual-density conversion information for converting each of the pieces of color component data such that a color close to the high-frequency color becomes substantially the same as the high-frequency color;

a color-component-data converting unit configured to convert, based on the individual-density conversion information generated for the high-frequency color by the individual-density-conversion-information generating unit, each of the pieces of color component data included in a part of the color image data read by the image reading unit, the part being color image data in which a color represented by the pieces of dot-removed color component data obtained by the smoothing performed by the dot-component removing unit is a color that is close to the high-frequency color; and an image forming unit configured to form an image on the basis of the pieces of color component data converted by the color-component-data converting unit, wherein the dot-component removing unit includes a first dot-component removing unit and a second dot-component removing unit that remove dot components by smoothing each of the pieces of color component data included in the color image data read by the image reading unit;

the high-frequency-color identifying unit identifies, from a plurality of colors represented by a plurality of pieces of first dot-removed color component data obtained by the smoothing performed by the first dot-component removing unit, a high-frequency color that satisfies a predetermined high-frequency condition;

the color-component-data converting unit converts, based on the individual-density conversion information generated for the high-frequency color by the individual-density-conversion-information generating unit, each of the pieces of color component data included in a part of the color image data read by the image reading unit, the part being color image data in which a color represented by a plurality of pieces of second dot-removed color component data obtained by the smoothing performed by the second dot-component removing unit is a color that is close to the high-frequency color;

the first dot-component removing unit converts a resolution of each of the pieces of color component data to a predetermined lower resolution while averaging each of the pieces of color component data with respect to each predetermined unit, and thereby removes dot components by smoothing each of the pieces of color component data;

the first dot-component removing unit removes dot components over the entire color image data read by the image reading unit;

the second dot-component removing unit removes dot components by smoothing each of the pieces of color component data with a predetermined smoothing filter; and the second dot-component removing unit removes dot components only on a dot portion of the color image data read by the image reading unit.

* * * * *